United States Patent Office 3,784,690
Patented Jan. 8, 1974

3,784,690
CONTROL OF PHYTOPATHOGENIC FUNGI WITH AMIDINE COMPOUNDS
Karl Gätzi, Basel, Switzerland, assignor to Ciba-Geigy Corporation, Ardsley, N.Y.
No Drawing. Original application May 22, 1968, Ser. No. 731,255, now Patent No. 3,598,800. Divided and this application Feb. 5, 1971, Ser. No. 113,108
Claims priority, application Switzerland, May 30, 1967, 7,615/67
Int. Cl. A01n 9/20, 9/22
U.S. Cl. 424—244    12 Claims

ABSTRACT OF THE DISCLOSURE

Antifungal compositions are disclosed which contain as active ingredients amidines of the formula

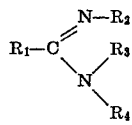

wherein $R_1$, $R_2$, $R_3$ and $R_4$ represent certain organic substituents, or salts of such amidines with inorganic or organic acids; these compositions are particularly useful for the protection of plants against phytopathogenic fungi; and also for combatting acarinae such as ticks. Methods for controlling such fungi on the one hand, and acarinae, on the other hand, with the aid of the aforesaid amidine derivatives are also described.

CROSS-REFERENCE TO RELATED APPLICATION

This is a division of application Ser. No. 731,255, filed May 22, 1968, now U.S. Pat. No. 3,598,800.

DETAILED DISCLOSURE

The present invention relates to new antifungal compositions, particularly for the control of phytopathogenic fungal growth on plants, which compositions contain substituted amidines and/or their salts as active substances; it also concerns a method for controlling phytopathogenic fungi with the aid of such amidines or salts thereof.

In another aspect the invention relates to a new process for controlling acarinae with the aid of the aforesaid amidines and salts thereof, and in still another aspect to novel amidine derivatives useful as antifungal agents and as acaricides.

Of the group of amidines, particularly formamidines are known as fungicidally active substances (Belgian Pat. No. 629,317, U.S. Pat. Nos. 3,164,633 and 3,143,571). In addition, the published German patent application 1,168,896 discloses amidines; such amidines have already been suggested for the chemical cleaning of fiber materials.

In contrast thereto, the invention provides compositions which contain as antifungally active substances organically C-substituted amidines of the formula

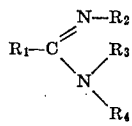
(I)

wherein $R_1$ and $R_3$ independently of each other each represent an unsubstituted or substituted alkyl or alkenyl radical, an unsubstituted or substituted cycloalkyl radical, an unsubstituted or substituted aromatic or araliphatic hydrocarbon radical, $R_2$ and $R_4$ independently of each other each represent an unsubstituted or substituted alkyl or alkenyl radical, an unsubstituted or substituted cycloalkyl radical or an unsubstituted or substituted araliphatic hydrocarbon radical, and $R_3$ and $R_4$ together with the adjacent nitrogen atom also represent a 3- to 7-membered heterocyclic radical which, in addition to the nitrogen atom, can also contain further hetero atoms as ring members.

These C-substituted amidines and their agriculturally acceptable salts with inorganic or organic acid have, in distinction from the known formamidines the formulas of which correspond to Formula I but with $R_1$ being hydrogen, good antifungal activity and are well tolerated by plants and warm-blooded animals, so that the novel compositions according to the invention containing these substances are excellently suited for the control of phytopathogenic fungi, especially on plants.

Alkyl and alkenyl suitable as radicals $R_1$ to $R_4$ are those having from 1 to 14 carbon atoms, and preferably in the case of $R_1$ from 3 to 14, and in the case of $R_2$ and $R_3$ preferably from 6 to 14 carbon atoms, and suitable cycloalkyl radicals are those with 5 or 6 carbon atoms as ring members. The alkyl and alkenyl radicals $R_1$ to $R_4$ can be mono- or poly-substituted, e.g. by halogen, amino, mono- or di-substituted amino, alkoxy and alkyl-thio groups. Primarily, the phenyl radical is meant by aromatic radical $R_1$ and/or $R_3$ and the benzyl and phenethyl radicals are suitable as araliphatic radicals $R_1$ to $R_4$. These aromatic and araliphatic radicals are unsubstituted or mono- or polysubstituted, e.g. by halogen, by alkyl, alkoxy, halogeno-alkyl and/or nitro groups. When there are several of those substituents present, these can be identical or different.

Heterocycles which can be formed by $R_3$ and $R_4$ together with the adjacent nitrogen atom are preferably saturated heterocycles, e.g. the pyrrolidine, piperidine, piperazine, morpholine and tetrahydroazepine radical.

As salts of the amidines with inorganic and organic acids, those with the following acids, for example, are meant: hydrohalic acids, sulphuric acid, phosphoric acids, acetic acid, aminoacetic acid, butyric acid, lauric acid, stearic acid, oxalic acid, adipic acid, maleic acid, tartaric acid, lactic acid, methane sulphonic acid, p-toluene sulphonic acid, etc.

Because of their very good action against numerous phytopathogenic fungi, agents which contain substituted amidines of the following Formula II and/or their salts, are of particular importance:

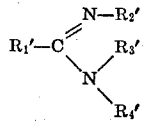
(II)

In this formula:

$R_1'$ represents an unsubstituted alkyl radical having 3 to 14 carbon atoms, a substituted or the unsubstituted phenyl, benzyl or phenethyl radical, $R_2'$ represents hydrogen, an unsubstituted or substituted alkyl radical having 6 to 14 carbon atoms, a substituted or the unsubstituted benzyl, phenethyl or cyclohexyl radical, $R_3'$ represents a substituted or unsubstituted alkyl radical having 1 to 14 carbon atoms, a substituted or the unsubstituted phenyl, benzyl or phenethyl radical, $R_4'$ represents hydrogen or an alkyl radical having 1 to 4 carbon atoms, or $R_3'$ and $R_4'$ together with the adjacent nitrogen atom represent a 5- to 7-membered heterocyclic radical which can also contain further hetero atoms as ring members, provided that the radicals symbolized by $R_2'$ and $R_3'$ together contain at least 8 and at most 30 carbon atoms.

Best accessible compounds are those falling under Formula II, wherein $R_1'$ represents alkyl of from 3 to 14 carbon atoms, a phenyl radical or a phenyl-lower alkyl radical, any substituent of the latter two radicals being selected from chlorine and bromine, $R_2'$ represents hydrogen, alkyl of from 6 to 14 carbon atoms, cyclohexyl or di-(lower alkyl)-amino-lower alkyl, $R_3'$ represents alkyl of from 1 to 14 carbon atoms, lower alkoxy-lower alkyl, mono-(lower alkyl)-amino-lower alkyl, di-(lower alkyl)-amino-lower alkyl, or phenyl-lower alkyl, $R_4'$ represents hydrogen or alkyl of from 1 to 4 carbon atoms, or $R_3'$ and $R_4'$ together with the adjacent nitrogen atom represent pyrrolidino, piperidino, hexahydroazepino, or morpholino, and wherein $R_2'$ and $R_3'$ taken together contain at least 8 carbon atoms; and agriculturally acceptable salts of compounds of Formula II with an acid.

"Lower" used in this specification and in the appended claims in connection with an alkyl or alkoxy group means that such group has at most 6, and preferably not more than 4 carbon atoms.

Most preferred in view of their particularly satisfactory antifungal activity are those novel compounds which fall under the formula

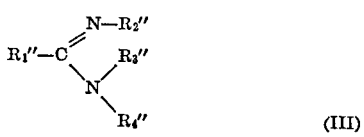

(III)

wherein $R_1''$ represents isopropyl, isobutyl or benzyl, $R_2''$ represents alkyl of from 6 to 14 carbon atoms, benzyl, or (N-higher alkyl-N-lower alkyl)-amino-lower alkyl wherein "higher alkyl" has from 6 to 14 carbon atoms, $R_3''$ represents alkyl of from 1 to 14 carbon atoms, and $R_4''$ represents hydrogen or alkyl of from 1 to 4 carbon atoms, or $R_3''$ and $R_4''$ taken together with the nitrogen atom to which they are linked represent piperidino or hexahydrazepino, $R_2''$ and $R_3''$ together containing at least 8 carbon atoms.

The compositions according to the invention are effective against fungi which cause plant disease, e.g. powdery mildews such as powdery mildew of cucumbers (*Eryspihe cichoracearum*) and powdery mildew of roses (*Sphaerotheca pannosa*); downy mildews such as those which cause late blight of potatoes (*Phytophthora infestans*); leaf spot pathogens such as *Alternaria solani*, rusts such as bean rust (*Uromyces app.*), also against grey mould (*Botrytis cinerea*) which is particularly difficult to control. Particularly because the amidines according to the invention also act as systemic fungicides, by using them it is possible to control or reduce fungal infections on plants and parts thereof (fruit, blossoms, foliage, stems). Because of this latter property, the parts of plants growing after treatment are also protected from attack by fungi. In addition, the agents according to the invention can be used for the treatment of seeds and of the soil.

The amidines of General Formula I also have differing insecticidal and acaricidal action. As contact and stomach poisons, they have a good action against insects and, particularly those of Formula III, against adult and larval stages of spiders, particularly those of the Ixodidae and Argasidae families, especially against ticks.

The fungicidal activity of the amidines usable according to the invention was determined by means of the following tests:

ACTION AGAINST *ALTERNARIA SOLANI* ON TOMATOES (*SOLANUM LYCOPERSICUM*)

After three to four weeks' growth in a greenhouse, tomatoes of the "Lucullus" type are sprayed dripping wet with the substance to be tested in the form of a spray suspension (concentration 0.1% active substance) and, after the spray coating has dried, they are infected with a standardized spore suspension of the fungi. After being kept for about 5 days in a moist atmosphere at about 22° C., small black lesions develop on the leaves. The test is rated according to the number of lesions.

In the following table:

10=inactive, infection equal to that on untreated control plants,
9-1=decreasing attack according to linear evaluation,
0=no growth of fungi.

*Alternaria solani*

N - decyl - N' - octyl isobutane-amidine _____ 2.
N-dodecyl-N'-octyl isobutane - amidine _____ 0.
N-tetradecyl-N'-octyl isobutane-amidine _____ 0.
N-[β-(N'' - octyl-N''-methyl-amino)-ethyl] - N' - octyl isobutane-amidine _____ 2.
N-n-hexyl - N' - octyl β-phenyl-ethane-amidine _____ 1.
N,N - dimethyl - N' - (2' - methyl - 4'-chlorophenyl) formamidine (known from Belgian Pat. No. 629,317); N,N - dimethyl-N'-(2'-methyl - 4' - bromophenyl)formamidine (known from Belgian Pat. No. 629,317) _____ Strongly phytotoxic plants killed.

ACTION AGAINST *BOTRYTIS CINEREA* ON *VICIA FABA* (BROAD BEANS)

Three well developed, equal sized leaves of *Vicia faba* which have been sprayed dripping wet with a suspension produced from the active substance in the form of a wettable powder (0.1% content of active substance) are laid in petri dishes which have been lined with moistened filter paper. After the spray coating has dried, the leaves are infected with a freshly prepared spore suspension of the fungi. After the leaves have been kept for 1–2 days in a moist atmosphere at 18–20° C., black lesions, which at first are tiny spots but which quickly spread, are formed on the leaves. The activity of the substance being tested is rated according to the number and size of the lesions.

In the following table:

10=inactive, infection equal to that on untreated control plants,
9–1=decreasing attack according to linear evaluation,
0=no growth of fungi.

*Botrytis cinerea*

| | |
|---|---|
| N-decyl-N'-methyl isobutane-amidine | 0 |
| N-tetradecyl-N'-octyl isobutane-amidine | 3 |
| N-[β-(N''-octyl-N''-methyl-amino) - ethyl]-N'-octyl isobutane-amidine | 2 |
| N-dodecyl-N'-octyl β-phenylethane-amidine | 1 |
| N-decyl-N'-octyl β-phenylethane-amidine | 3 |
| N-dodecyl-N'-dimethyl isobutane-amidine | 0 |
| N-benzyl-N'-dimethyl dodecane-amidine | 0 |
| N-tetradecyl-N'-pentamethylene isobutane-amidine | 1 |
| N-tetradecyl-N'-pentamethylene isopentane-amidine | 1 |
| N,N-dimethyl-N'-(2'-methyl-4'-chlorophenyl) form-amidine (known from Belgian Pat. No. 629,317) | 10 |
| N,N-dimethyl-N'-(2'-methyl-4'-bromophenyl) form-amidine (known from Belgian Pat. No. 629,317) | 10 |

ACTION ON *ERYSIPHE CICHORACEARUM* (POWDERY MILDEW OF CUCUMBERS) ON CUCUMBERS (*CUCUMIS SATIVUS*)

Young cucumber plants are sprayed dripping wet with a 0.1% suspension of the active substance in the form of wettable powder and, after the spray coating has dried, they are sprayed with a spore suspension of powdery mildew of cucumbers. The plants are then placed in a greenhouse at about 23° C. After 8 days, the degree of attack (area of leaf surface covered by the Mycelium) on the infected treated leaves is determined by comparison with untreated, infected controls.

In the following table:

10=inactive, infection equal to that on untreated control plants,
9–1=decreasing attack according to linear evaluation,
0=no growth of fungi.

*Erisyphe cichoracearum*

| | |
|---|---|
| N-decyl-N'-octyl isobutane-amidine | 2 |
| N-benzyl-N'-octyl isobutane-amidine | 1 |
| N-hexyl-N'-octyl β-phenylethane-amidine | 2 |
| N,N-dimethyl-N'-(2'-methyl-4' - chlorophenyl) form-amidine (known from Belgium Pat. No. 629,317) | 10 |
| N,N-dimethyl-N'-(2'-methyl - 4'-bromophenyl)-form-amidine (known from Belgium Pat. No. 629,317) | 10 |

ACTION ON *UROMYCES APPENDICULATUS* (BEAN RUST) ON BEANS (*PHASEOLUS VULGARIS*)

Bean plants in the two-leaf stage are sprayed dripping wet with a suspension of the test substances in the form of wettable powders (concentration 0.1% active substance). After the spray coating has dried, the plants are infected with a fresh spore suspension of bean rust (5 plants for each product). They are then left for 1 day in a moist atmosphere and then put into a greenhouse at 20–22° C. The test is rated according to the number of rust infections after about 8–12 days.

In the following table:

10=inactive, infection equal to that on untreated control plants,
9–1=decreasing attack according to linear evaluation,
0=no growth of fungi.

*Uromyces appendiculatus*

| | |
|---|---|
| N-dodecyl-N'-methyl isobutane-amidine | 3 |
| N,N'-dioctyl isobutane-amidine | 0 |
| N-dodecyl-N'-octyl isobutane-amidine | 0 |
| N-tetradecyl-N'-octyl isobutane-amidine | 3 |
| N-hexyl-N'-octyl β-phenylethane-amidine | 1 |
| N-octyl-N'-hexamethylene isobutane-amidine | 3 |
| N-dodecyl-N',N'-dimethyl isobutane-amidine | 3 |
| N-octyl-N'-di-n-butyl isobutane-amidine | 0 |
| N-tetradecyl-N'-pentamethylene isobutane-amidine | 0 |
| N-tetradecyl-N'-pentamethylene isopentane-amidine | 0 |
| N-dodecyl-N'-pentamethylene isobutane-amidine | 0 |
| N,N-dimethyl-N'-(2' - methyl - 4'-chlorophenyl) form amidine (known from Belgium Pat. No. 629,317) | 8 |
| N,N-dimethyl-N' - (2'-methyl-4'-bromophenyl) form-amidine (known from Belgium Pat. No. 629,317) | 8 |

ACTION AGAINST TICKS

Four fully gorged female ticks (*Boophilus microplus*) are kept for 3 minutes under the surface of a 0.1% aqueous solution of N-tetradecyl-N'-pentamethylene-isopentane amidine. After 5 days all test animals are dead and no larvae develop from the eggs laid in the intervening period.

In the above concentration of about 0.1% and higher, up to about 1% of active substance in the aforesaid solution, the amidines of Formula I can be applied to animals infested with ticks or to plants infested with spider mites and the like acarinae.

Amidines according to the invention can be obtained according to R. L. Shriner et al., Chem. Reviews, 35, p. 351 (1944), and the following summarized processes, such as the reaction of:

(a) iminoether hydrochloride with the alcoholic solution of a primary or secondary amine [A. Pinner, "Die Iminoäther und ihre Derivate," p. 86, published by R. Oppenheim, Berlin (1892)];
(b) monosubstituted amidines with primary or secondary amines while splitting off ammonia;
(c) amides with primary or secondary amines in the presence of dialkyl sulphates or benzene sulphonic acid esters [H. Bredereck et al., Angew. Chem., 74, 353 (1962)];
(d) chloroimides with primary or secondary amines (Houben-Weyl, 4th ed., vol. XI/2).

The following non-limitative examples illustrate the production of active substances of General Formula I. The other active substances falling under Formula I are produced in an analogous manner. Where not otherwise stated, parts are given as parts by weight; the temperatures are given in degrees centigrade.

EXAMPLE 1

15.1 parts of isobutyrimido-ethyl ether hydrochloride are dissolved in 50 parts by volume of anhydrous ethyl alcohol. A solution of 13 parts of octylamine in 50 parts by volume of anhydrous ethanol is added at room temperature and the whole is stirred for 6 hours at this temperature. The solvent is then evaporated in vacuo, water is added to the residue, the reaction is made alkaline to mimosa paper with dilute sodium hydroxide solution and it is extracted with ether. The ether residue is fractionated in vacuo: B.P.$_{12}$ 148–150°, B.P.$_{0.02}$ 82–84°. The yield of N-octyl isobutane amidine is 85%.

EXAMPLE 2

19.8 parts of N-octyl isobutane-amidine and 18.6 parts of dodecylamine are dissolved in 100 parts by volume of anhydrous toluene and the solution is refluxed for 48 hours. No more ammonia is split off by the end of this time. The whole is evaporated in vacuo and the residue is fractionated in vacuo. The N-octyl-N'-dodecyl isobutane amidine boils at 156–170° under 0.03 torr. It is a colorless to pale yellow colored oil. The yield is 32%.

EXAMPLE 3

12.7 parts of dimethyl sulphate are added at 40–50° to 20 parts of isobutyric acid octylamide and the whole is then stirred for 5 hours at 70°. 32.7 parts of adduct are obtained.

32.6 parts of the above adduct are dissolved in 70 parts by volume of water and alcohol-free chloroform. At 40°, 21.4 parts of tetradecylamine dissolved in 40 parts by volume of chloroform are added dropwise and the whole is stirred under reflux for 12 hours at 60°. The solvent is evaporated in vacuo, the residue is dissolved in water, the reaction is made alkaline to mimosa paper at 0–5° with concentrated sodium hydroxide solution and then it is ethered out. The ether residue is fractionated under high vacuum. The N-octyl - N'-tetradecyl-isobutane-amidine boils at 178–183° under 0.02 torr. The yield is 35.2%.

The compounds summarized in the following table are produced analogously to Examples 1 to 3:

agents, granulates such as coated granules, impregnated granules, homogeneous granules, wettable powders, pastes, emulsions, solutions or aerosols.

To produce the solid forms for use (dusts, sprinkling agents, granulates), the active substances are mixed with solid carriers. Examples of carriers are kaolin, talcum, bole, loess, chalk, limestone, ground limestone, Attaclay, dolomite, diatomaceous earth, precipitated silicic acid, alkaline earth silicates, sodium and potassium aluminium silicates (feldspar and mica), calcium and magnesium sulphate, magnesium oxide, milled synthetic plastics, fertilizers such as ammonium sulphate, ammonium nitrate, urea, ground vegetable products such as bran, bark dust, sawdust, ground nutshells, cellulose powder, residues of plant extractions, active charcoal, etc. These carriers can be used alone or admixed with each other.

The particle size of the carriers is, for dusts advantageously up to about 0.1 mm., for sprinkling agents from about 0.075–0.2 mm. and for granulates from 0.2 mm. or more.

| $R_1$ | $R_2$ | $R_3$ | $R_4$ | Boiling point Degrees | Torr | Melting point, degrees |
|---|---|---|---|---|---|---|
| $C_3H_7$(iso) | H | $C_{12}H_{25}$ | H | | | HCl-S [1] 111–113 |
| $C_3H_7$(iso) | H | $C_{14}H_{29}$ | H | | | 50–51 |
| $C_3H_7$ (iso) | H | Benzyl | H | | | [1] 162–163 |
| $C_6H_{13}$ | H | $C_8H_{17}$ | H | 126–128 | 0.01 | |
| $C_3H_7$ (iso) | $C_2H_5$ | $C_8H_{17}$ | H | 86–89 | 0.02 | |
| $C_3H_7$ (iso) | $C_4H_9$ (n) | $C_8H_{17}$ | H | 110–114 | 0.02 | |
| $C_3H_7$ (iso) | $C_8H_{17}$ | $C_8H_{17}$ | H | 127–128 | 0.03 | |
| $C_3H_7$ (iso) | $C_8H_{17}$ | $(CH_2)_3OC_4H_9$ | H | 138–141 | 0.02 | |
| $C_3H_7$ (iso) | $C_8H_{17}$ | $-C_2H_4-NH-C_6H_{13}$ | H | 130–132 | 0.02 | |
| $C_3H_7$ (iso) | $C_8H_{17}$ | $-C_2H_4-N(CH_3)_2$ | H | 104–107 | 0.02 | |
| $C_3H_7$ (iso) | $C_{10}H_{21}$ | $C_8H_{17}$ | H | 142–148 | 0.02 | |
| $C_3H_7$ (iso) | $C_{14}H_{29}$ | $C_{14}H_{29}$ | H | 193–207 | 0.02 | 31–32 |
| $C_3H_7$ (iso) | $-C_2H_4N\begin{smallmatrix}CH_3\\C_8H_{17}\end{smallmatrix}$ | $C_8H_{17}$ | H | 150–170 | 0.4 | |
| $C_3H_7$ (iso) | Benzyl | $C_8H_{17}$ | H | 110–116 | 0.02 | |
| $C_3H_7$ (iso) | Cyclohexyl | $C_8H_{17}$ | H | 112–114 | 0.03 | |
| Phenyl | $C_8H_{17}$ | $C_8H_{17}$ | H | 155–158 | 0.02 | |
| Do | $C_{12}H_{25}$ | $C_8H_{17}$ | H | 193–195 | 0.02 | |
| Do | $C_{10}H_{21}$ | $C_8H_{17}$ | H | 178–182 | 0.02 | |
| $Cl-\langle\bigcirc\rangle-$ | $C_8H_{17}$ | $C_6H_{13}$ | H | 168–169 | 0.01 | |
| Benzyl | $C_6H_{13}$ | $C_8H_{17}$ | H | 139–149 | 0.02 | |
| Do | $C_8H_{17}$ | $C_8H_{17}$ | H | 175–180 | 0.02 | |
| Do | $C_{10}H_{21}$ | $C_8H_{17}$ | H | 180–183 | 0.02 | |
| $C_3H_7$ (iso) | H | $C_6H_{13}$ | $CH_3$ | 118–120 | 12 | |
| $C_3H_7$ (iso) | H | $C_{10}H_{21}$ | $CH_3$ | 101 | 0.01 | |
| $C_3H_7$ (iso) | H | $C_{12}H_{25}$ | $CH_3$ | 123–124 | 0.03 | |
| $C_3H_7$ (iso) | $C_8H_{17}$ | $C_4H_9$ | $CH_3$ | 96–97 | 0.1 | |
| $C_3H_7$ (iso) | $C_8H_{17}$ | $C_8H_{17}$ | $CH_3$ | 140–142 | 0.1 | |
| $C_3H_7$ (iso) | $C_8H_{17}$ | $C_{12}H_{25}$ | $CH_3$ | 161–163 | 0.02 | |
| $C_4H_9$ (iso) | $C_8H_{17}$ | $CH_3$ | $CH_3$ | 81–83 | 0.02 | |
| $C_4H_9$ (iso) | $C_{12}H_{25}$ | $CH_3$ | $CH_3$ | 124–127 | 0.02 | |
| $C_4H_9$ (iso) | $C_{14}H_{29}$ | $CH_3$ | $CH_3$ | 144–148 | 0.02 | |
| $C_4H_9$ (iso) | $C_8H_{17}$ | $C_8H_{17}$ | $CH_3$ | 140–144 | 0.02 | |
| $C_4H_9$ (iso) | $C_{12}H_{25}$ | $C_8H_{17}$ | $CH_3$ | 105–107 | 0.02 | |
| $C_{11}H_{23}$ | $C_8H_{17}$ | $CH_3$ | $CH_3$ | 180–188 | 0.03 | |
| $C_{11}H_{23}$ | $C_{12}H_{25}$ | $CH_3$ | $CH_3$ | 195–205 | 0.02 | |
| $C_{11}H_{23}$ | Benzyl | $CH_3$ | $CH_3$ | 165–175 | 0.02 | |
| $C_4H_9$ (iso) | $C_8H_{17}$ | $C_4H_9$ (n) | $C_4H_9$ (n) | 128–132 | 0.02 | |
| $C_4H_9$ (iso) | $C_{12}H_{25}$ | $C_4H_9$ (n) | $C_4H_9$ (n) | 152–156 | 0.02 | |
| $C_3H_7$ (iso) | $C_8H_{17}$ | $-(CH_2)_4-$ | | 104–105 | 0.02 | |
| $C_3H_7$ (iso) | $C_8H_{17}$ | $-(CH_2)_5-$ | | 106–111 | 0.02 | |
| $C_3H_7$ (iso) | $C_8H_{17}$ | $-(CH_2)_6-$ | | 108–112 | 0.01 | |
| $C_3H_7$ (iso) | $C_8H_{17}$ | $-(CH_2)_2-O-(CH_2)_2-$ | | 106–111 | 0.02 | |
| $C_4H_9$ (iso) | $C_8H_{17}$ | $-(CH_2)_5-$ | | 117–121 | 0.02 | |
| $C_4H_9$ (iso) | $C_{12}H_{25}$ | $-(CH_2)_5-$ | | 114–150 | 0.02 | |
| $C_4H_9$ (iso) | $C_{14}H_{29}$ | $-(CH_2)_5-$ | | 164–172 | 0.02 | |
| $C_4H_9$ (iso) | $C_{14}H_{29}$ | $-(CH_2)_2-O-(CH_2)_2-$ | | 150–161 | 0.02 | |

[1] HCl=salt.

For use in plant protection, the active substances are incorporated in the usual way into distributing agents and/or carriers and so used that the concentration of active substance is in the range of 0.01 to 2% calculated on the total weight of the composition.

The antifungal compositions according to the invention are produced by intimately mixing and milling the active substances of General Formula I with suitable carriers, optionally with the addition of dispersing agents or solvents which are inert to the active substances. The new active substances can be used in form of dusts, sprinkling As a general rule, the concentrations of active substance in the solid preparations are from 0.5–80% calculated on the total weight of the preparation.

To these mixtures can also be added additives which stabilize the active substance and/or non-ionic, anionically and cationally active substances which, for example, improve the adhesion of the active substances on plants and parts thereof (glues and adhesives) and/or attain better wettability (wetting agents) and dispersibility (dispersing agents) of the active substances. The following are examples of adhesives: olein-chalk mixture, cellulose derivatives (methyl cellulose, carboxymethyl cellulose, hydroxyethyl cellulose); the following substances can serve e.g. as wetting and dispersing agents: polyethylene glycol ethers of mono- and di-alkylphenols having 5–15 ethylene oxide radicals per molecule and 8–9 carbon atoms in the alkyl radical, lignin sulphonic acids, the alkali and alkaline earth salts thereof, polyethylene glycol ethers (carbowaxes), fatty alcohol polyethylene glycol ethers having 5–20 ethylene oxide radicals per molecule and 8–18 carbon atoms in the fatty alcohol part, condensation products of ethylene oxide/propylene oxide, polyvinyl pyrrolidones, polyvinyl alcohols, condensation products of urea/formaldehyde, as well as latex products.

The concentrates of active substance which can be dispersed in water, i.e. wettable powders, pastes and emulsion concentrates, are agents which can be diluted with water to any concentration desired. They consist of active substance, carrier, optionally additives which stabilize the active substance, surface active substances, and anti-foam agents and, optionally, solvents. The concentration of active substance in these agents is 5–80% calculated on the total weight of the agent.

Wettable powders and pastes are obtained by mixing and milling the active substances with dispersing agents and pulverulent carriers in suitable apparatus until homogeneity is attained. Carriers are, for example, those mentioned in the paragraph dealing with solid forms for application. In some cases it is advantageous to use mixtures of different carriers. The following can be used e.g. as dispersing agents: condensation products of sulphonated naphthalene and sulphonated naphthalene derivatives with formaldehyde, condensation products of naphthalene or naphthalene sulphonic acids with phenol and formaldehyde, also alkali, ammonium and alkaline earth salts of lignin sulphonic acid, also alkyl aryl sulphonates, alkali and alkaline earth salts of dibutyl naphthalene sulphonic acid, fatty alcohol sulphates such as salts of sulphated hexadecanols, heptadecanols, octadecanols, octadecenols and salts of sulphated fatty alcohol polyglycol ethers, the sodium salt of oleoyl ethionate, the sodium salt of oleoyl methyl tauride, ditertiary acetylene glycols, dialkyl dilauryl ammonium chloride and fatty acid alkali and alkaline earth salts.

Silicones, as "Antifoam A" are used, for example, as anti-foam agents. The active substances are so mixed, milled, sieved and strained with the additives mentioned above that the solid particle size in wettable powders of 0.02–0.04 mm. and, in pastes of 0.003 mm. is not exceeded. To produce emulsion concentrates and pastes, dispersing agents such as those given in the previous paragraphs, organic solvents and water are used. Examples of solvents are as follows: alcohols, benzenes, xylenes, toluene, dimethyl sulphoxide and mineral oil fractions boiling between 120 and 350° C. The solvents must be odorless, not phytotoxic, inert to the active substances and not easily inflammable.

In addition, the compositions according to the invention can be applied in the form of solutions. For this purpose, the active substance or several active substances of General Formula I are dissolved in suitable organic solvents, mixtures of solvents or in water. Aliphatic and aromatic hydrocarbons, chlorinated derivatives thereof, alkyl naphthalenes, alone or mixed with each other can be used as organic solvents. The solutions should contain the active substances in a concentration from 1–20%.

Other biocidally active compounds or agents can be mixed with the compositions according to the invention described. Thus, to broaden the range of action, the new compositions can contain, in addition to the compounds mentioned of General Formula I, e.g. insecticides, other fungicides, bactericides, fungistatics, bacteriostatics or nematocides. The compositions according to the invention can also contain fertilizers, trace elements, etc.

The following forms for application of the compositions according to the invention serve to illustrate the invention further. Where not otherwise expressly stated, "parts" means parts by weight.

DUST

The following substances are used to produce a 5% dust:

5 parts of N-tetradecyl-N'-octyl isobutane-amidine or of N-octyl-N'-n-hexyl β-phenyl-ethane-amidine,
10 parts of colloidal silicic acid,
85 parts of talcum.

A homogeneous mixture is produced from the active substance named above, 20 parts of talcum and the colloidal silicic acid. This is then diluted with the remaining 65 parts of talcum and then finely milled. The dust so obtained is used e.g. for the treatment of seed beds or for the dusting of cultivated plants.

GRANULATE

The following substances are used to produce a 5% granulate:

87.25 parts of ground limestone (granulate 0.4–0.8 mm.),
6.25 parts of a liquid mixture of 5.0 parts of N-tetradecyl-N'-octyl isobutane-amidine, 0.25 part of oleyl octaglycol ether and 1 part of polyethylene glycol,
6.5 parts of precipitated silica.

An intimate mixture is produced from the ground limestone and 2.75 parts of precipitated silica which is then impregnated with the previously prepared liquid mixture of active substance. As soon as this has been evenly distributed on the granules, the remainder of the silica is mixed in in portions. A non-dusty granulate is obtained which is particularly suitable for the disinfection of soil or seed beds.

WETTABLE POWDERS

The following substances are used to produce (a) and (b) 25%, and (c) 40% wettable powders:

(a)

| | Parts |
|---|---|
| N-tetradecyl-N'-octyl-isobutane amidine | 25 |
| Oleyl octaglycol ether | 2.5 |
| Oleyl pentaglycol ether | 2.5 |
| Sodium aluminum silicate | 25 |
| Silica | 35 |

(b)

| | Parts |
|---|---|
| N-octyl-N'-decyl-isobutane amidine | 25 |
| Purified kieselguhr | 30 |
| Oleyl octaglycol ether | 5 |
| Kaolin | 20 |
| Polyvinyl alcohol | 1 |
| Ammonium bicarbonate | 1 |
| Champagne chalk | 18 |

(c)

| | Parts |
|---|---|
| N'-tetradecyl-isobutane amidine | 40 |
| Oleyl octaglycol ether | 4 |
| Magnesium carbonate (precipitated) | 10 |
| Sodium aluminum silicate | 46 |

The active substances mentioned are mixed and finely milled with the carriers and distributing agents mentioned. Wettable powders are obtained which have excellent wettability and suspendability. Suspension can be obtained of any concentration of active substances desired from such wettable powders by dilution with water. They serve for the treatment of cultivated plants.

The following components are used for the preparation of a 20% wettable powder:

20 parts of N-tetradecyl-N'-pentamethylene isobutane-amidine,
10.2 parts of p-toluene sulphonic acid,
3 parts of a condensation product of nonylphenyl-polyethylene glycol (9–10 mols of ethylene oxide per mol nonylphenol),
7 parts of sodium methylene bis naphthalene sulfonate,
40 parts of precipitated silicic acid,
3.5 parts of Champagne chalk,
2 parts of a milled 50% pulverulent concentrate as adhesive, which consists of 50% of a polyvinyl alcohol and 50% of kaolin,
14.3 parts of "silica clay."

The active substance is melted with p-toluene sulphonic acid (molar ratio 1:1) at 40–80° and a part of the total quantity of silicic acid necessary is coated with the homogeneous melt so obtained while it is still warm, and the whole is worked up into a pulverulent concentrate (A). The remainder of the silicic acid is coated with the liquid wetting agents (B). The concentrates (A) and (B) are intimately mixed and the other pulverulent inert ingredients are worked into the resultant mixture. The whole mixture is then finely milled and mixed until homogeneity it attained. A wettable powder having excellent wettability and suspendibility is obtained.

EMULSION CONCENTRATE

The following substances are used to produce a 50% emulsion concentrate:

50 parts of N-tetradecyl-N'-octyl-isobutane-amidine,
35 parts of xylene,
15 parts of an nonylphenol/ethylene oxide condensate (molar ratio about 1:10).

The active substance is dissolved in xylene and the emulsifier is then added to this solution. An emulsion concentrate is obtained which can be diluted with water to any desired concentration. This emulsion is suitable for the treatment of cultivated plants.

I claim:

1. An antifungal composition comprising (1) as active ingredient, a fungicidally effective amount of a compound of the formula $$R_1''-C \begin{subarray}{c} N-R_2'' \\ \diagdown \\ N \\ | \\ R_4'' \end{subarray} R_3''$$

wherein
$R_1''$ represents isopropyl, isobutyl or benzyl,
$R_2''$ represents alkyl of from 6 to 14 carbon atoms, benzyl or (N-higher alkyl-N-lower alkyl) amino lower alkyl where "higher alkyl" has from 6 to 14 carbon atoms,
$R_3''$ represents alkyl of from 1 to 14 carbon atoms, and
$R_4''$ represents hydrogen or alkyl from 1 to 4 carbon atoms, or
$R_3''$ and $R_4''$ taken together with the nitrogen atom to which they are linked represent piperidino or hexahydrozepino,
$R_2''$ and $R_3''$ together containing at least 8 carbon atoms, and (2) an agriculturally acceptable carrier or distributing agent.

2. A composition according to claim 1 in which, in the compound, $R_3''$ represents alkyl of from 1 to 14 carbon atoms and $R_4''$ represents hydrogen or alkyl of from 1 to 4 carbon atoms.

3. A method for controlling phytopathogenic fungi which comprises applying to plants infested with said fungi a fungicidally effective amount of a compound of the formula $$R_1''-C \begin{subarray}{c} N-R_2'' \\ \diagdown \\ N \\ | \\ R_4'' \end{subarray} R_3''$$

wherein
$R_1''$ represents isopropyl, isobutyl or benzyl,
$R_2''$ represents alkyl of from 6 to 14 carbon atoms, benzyl or (N-higher alkyl-N-lower alkyl) amino lower alkyl where "higher alkyl" has from 6 to 14 carbon atoms,
$R_3''$ represents alkyl of from 1 to 14 carbon atoms, and
$R_4''$ represents hydrogen or alkyl of from 1 to 4 carbon atoms, or
$R_3''$ and $R_4''$ taken together with the nitrogen atom to which they are linked represent piperidino or hexahydrozepino,
$R_2''$ and $R_3''$ together containing at least 8 carbon atoms.

4. A method according to claim 3 in which, in the compound, $R_3''$ represents alkyl of from 1 to 14 carbon atoms and $R_4''$ represents hydrogen or alkyl of from 1 to 4 carbon atoms.

5. A method according to claim 4 in which the compound is N-tetradecyl-N'-octyl isobutane-amidine.

6. A method according to claim 4 in which the compound is N-dodecyl-N'-octyl isobutane-amidine.

7. A method according to claim 4 in which the compound is N-decyl-N'-methyl isobutane-amidine.

8. A method according to claim 4 in which the compound is N-dodecyl-N',N'-dimethyl isobutane-amidine.

9. A method according to claim 4 in which the compound is N-n-hexyl-N'-octyl (β-phenylethane)-amidine.

10. A method according to claim 3 in which $R_3''$ and $R_4''$ taken together with the nitrogen atom to which they are linked represent piperidino or hexahydroazepino.

11. A method according to claim 10 in which the compound is N - tetradecyl - N' - pentamethylene isobutane-amidine.

12. A method according to claim 10 in which the compound is N - tetradecyl - N'-pentamethylene isopentane-amidine.

References Cited

UNITED STATES PATENTS

| | | | |
|---|---|---|---|
| 2,049,582 | 8/1936 | Ziegler | 260—127 |
| 2,211,280 | 8/1940 | Martin et al. | 260—564 |
| 2,450,386 | 9/1948 | Short et al. | 260—564 |

ALBERT T. MEYERS, Primary Examiner

L. SCHENKMAN, Assistant Examiner

U.S. Cl. X.R.

424—244, 238, 274, 326